(12) United States Patent
Gaubatz et al.

(10) Patent No.: US 8,494,282 B2
(45) Date of Patent: Jul. 23, 2013

(54) BLUR ESTIMATION

(75) Inventors: Matthew D. Gaubatz, Ithaca, NY (US); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 12/838,857

(22) Filed: Jul. 19, 2010

(65) Prior Publication Data

US 2012/0014604 A1  Jan. 19, 2012

(51) Int. Cl.
*G06K 9/40* (2006.01)
*G02B 5/00* (2006.01)
*G06K 19/06* (2006.01)

(52) U.S. Cl.
USPC .................. 382/190; 235/462.32; 235/494

(58) Field of Classification Search
USPC .................. 235/462.32, 494; 382/190, 255
See application file for complete search history.

(56) References Cited

U.S. PATENT DOCUMENTS

| | | | |
|---|---|---|---|
| 5,745,597 A * | 4/1998 | Agazzi et al. ................. | 382/182 |
| 6,456,728 B1 * | 9/2002 | Doi et al. ...................... | 382/103 |
| 6,594,029 B1 | 7/2003 | Mellor et al. | |
| 6,917,721 B2 * | 7/2005 | Elad et al. .................... | 382/300 |
| 2009/0277962 A1 * | 11/2009 | McCloskey .............. | 235/462.01 |
| 2011/0058050 A1 * | 3/2011 | Lasang et al. ............. | 348/208.4 |

OTHER PUBLICATIONS

Gerald Krell, et.al., "An Artificial Neural Network For Real-Time Image Restoration" IEEE Instrumentation and Measurement Technology Conf, Jun. 4-6, 1996, Brussels, Belguim, 6 p.

* cited by examiner

*Primary Examiner* — Amara Abdi
(74) *Attorney, Agent, or Firm* — Steven L. Webb

(57) ABSTRACT

A method and apparatus for removing blur in an image is disclosed. The blur in the image is caused by relative motion between the imaging device and the object being imaged. A set of differences between the pixel values in the image is calculated. The set of differences in pixel values are divided into two groups, wherein the first group of differences in pixel values corresponds to differences in pixel values due to noise, and the second group of differences in pixel values corresponds to differences in pixel values due to noise and motion. An estimate of the motion blur is determined using the second group of differences in pixel values. The estimate of the blur is then used to remove the blur from an image.

15 Claims, 2 Drawing Sheets

BLUR ESTIMATION

BACKGROUND

Barcodes have been in use since 1974. Barcodes are machine readable representations of data. In a basic one-dimensional barcode, the data is typically encoded by the thicknesses of parallel lines and the distance or thicknesses of the spaces between the parallel lines. Some barcodes have additional, or secondary, information encoded into the lines. The mapping between messages and barcodes is called a symbology. The specification of a symbology includes the encoding of the single digits/characters of the message as well as the start and stop markers into bars and space, the size of the quiet zone required to be before and after the barcode, as well as the computation of a checksum.

The symbology also includes a definition for the thicknesses of the parallel lines and spaces in a barcode. There are two main types of linear symbologies: two-width symbologies and many-width symbologies. Bars and spaces in two-width symbologies are wide or narrow. How wide a wide bar is exactly has no significance as long as the symbology requirements for wide bars are adhered to, usually two to three times wider than a narrow bar. Bars and spaces in many-width symbologies are all multiples of a basic width called the module. Most many-width symbologies use four widths of 1, 2, 3 and 4 modules.

One use for barcodes is to electronically identify items during checkout. Barcodes may also be used during the manufacturing process. When used in a manufacturing process, the barcode may be in motion when scanned. On a high speed manufacturing line, or a high speed printing press, the speed of the barcode with respect to the barcode reader may cause the image of the barcode being scanned to be blurred in the direction of motion. When the blurring or smearing becomes too pronounced, the barcode may become unreadable.

One way to reduce the blurring of the barcode image is to slow down the relative motion between the barcode and the barcode reader. Another method to reduce the blurring of the barcode image is to increase the illumination (e.g. through strobing) so that the exposure time used to capture the image of the barcode is shortened. Some methods use image processing to remove the blur from the barcode image. One example of image processing to remove blur is a de-convolution using a Wiener Filter. De-convolution to remove blur typically requires a measure of the blur diameter (or blur radius, which is half the blur diameter).

FIG. 1a is a bar from a barcode. FIGS. 1b-1d are inverse plots of intensity from the image of the bar in FIG. 1a formed at different scanning speeds. The image in FIG. 1b was scanned relatively slowly. The image in FIG. 1b has some blurring along each edge of the bar. The intensity I reaches a minimum in the middle of the bar as shown by the flat top. The blur diameter B can be calculated from the image in FIG. 1b by measuring the horizontal distance between the end or edge of the flat top and the beginning of the flat bottom of the curve. The horizontal distance between the end or edge of the flat top and the beginning of the flat bottom of the curve corresponds to the blur diameter. Using the blur diameter, image processing can be used to remove the blur from the image thereby enabling the measurement of the thickness of the bar. Once the thickness of the bars and spaces are measured, the barcode can be decoded.

The image in FIG. 1c was scanned at a faster speed. The image in FIG. 1c has significantly more blurring along each edge of the bar. The intensity I may reach a minimum in the middle of the bar, but it's difficult to confirm. The image in FIG. 1d was scanned at the fastest speed. The image in FIG. 1d has blurring along the entire image of the bar. The intensity does not reach the minimum intensity I in the middle of the bar and therefore there is no flat top in the image. A blur diameter B cannot be calculated from the image in FIG. 1d by measuring from the edge of the flat top, because there is no flat top from which to measure it. In general, when the blur radius is greater than ½ the bar thickness, the blur radius cannot always be calculated from the blurred image. The blur radius essentially sets the physical speed limit a barcode can be moving during scanning for a given exposure time. The spacing between bars in a barcode also affects the maximum speed at which a barcode can be moving when scanned.

DETAILED DESCRIPTION

Figure 1A:
FIG. 1a is a bar from a barcode.
Figure 1B:
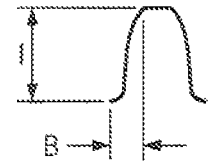
FIG. 1b-1d are inverse plots of intensity from the image of the bar in FIG. 1a formed at different scanning speeds.
Figure 1C:
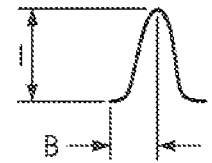
Figure 1D:
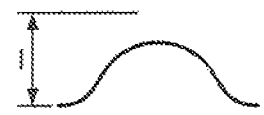
Figure 3:
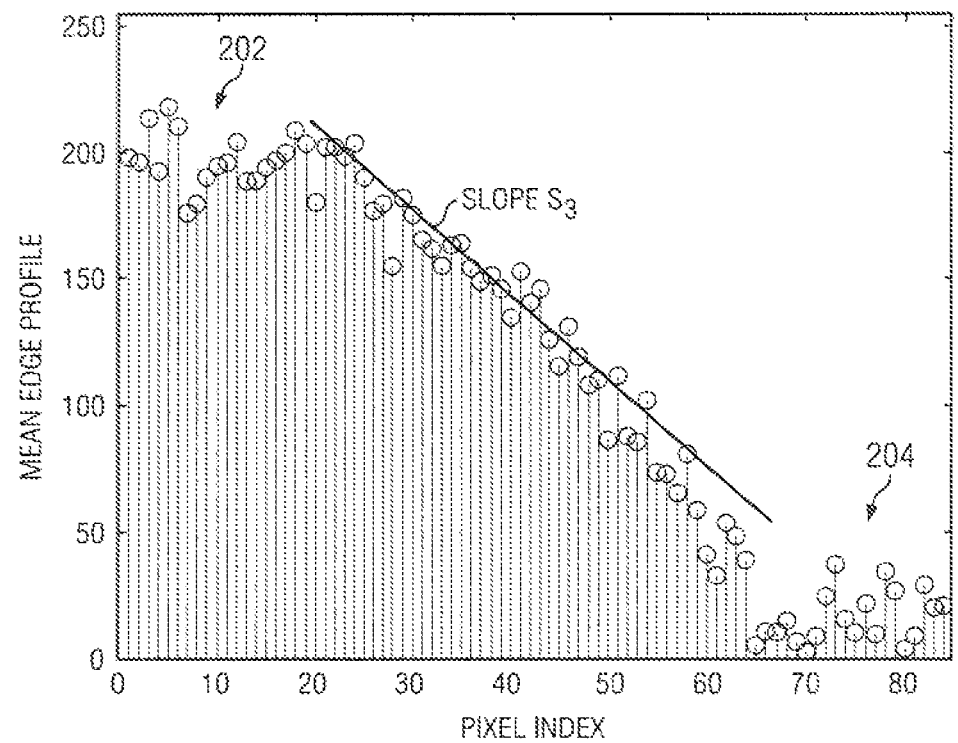
FIG. 3 is an intensity plot of the image in FIG. 2a scanned under noisy conditions, in an example embodiment of the invention.

FIGS. 1-3, and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

When a document is scanned while in motion, the image of the document may become blurred due to the relative motion between the document and the scanning device. The image of the document will contain other distortions as well; for example, lighting distortions, noise, and geometric distortions. An image restoration pipeline may be used to remove the different distortions. A scanned image of a barcode may be used to calibrate the image restoration pipeline. Calibrating the image restoration pipeline with the barcode may involve producing an estimate of the motion blur from the barcode even under the conditions where the blur radius is greater than ½ the maximum bar thickness of the barcode being read.

When calculating the parameters for an image restoration pipeline, a system distortion model may need to be used. In this example embodiment of the invention, the system distortion model will comprise a lighting component and a motion component. Lighting distortion is modeled as a linear process. The introduction of motion blur is modeled as a convolutional operation. The following notation is used to make these ideas explicit. Let b(x,y) denote a barcode, and $b_{print+capture}(x,y)$ represent the printed, captured barcode. Distortions are given by the following set of equations:

$$(\text{lighting distortion})\text{output}(x,y) = M \cdot \text{input}(x,y) + B,$$

$$(\text{motion blur distortion})\text{output}(x,y)(h*\text{input})(x,y),$$

where h(x,y) represents the blur operator. Suppose that h(x,y) is normalized, such that the sum of all filter values is equal to one. Given these assumptions, and lighting distortion parameters M and B, $$b_{print+capture}(x,y) = M \cdot (h*b)(x,y) + B.$$

Estimation of the lighting parameters can be made in a number of different ways, but this patent is not directed towards methods of estimating the lighting distortions. The quantity h(x,y) models the effects of motion blur. In one example embodiment of the invention, the motion blur h(x,y) is modeled as a one-dimensional moving average using an H-tap filter with values equal to 1/H.

The motion blur h(x,y) can be estimated by taking advantage of the bi-level nature of barcodes. As indicated above, b(x,y) represents a barcode. In the noise free case, the magnitude of the horizontal difference between two adjacent samples of b(x,y) is either zero or M/H. This observation suggests that H can be estimated by comparing two adjacent horizontal pixels in the image of the printed barcode $b_{print+capture}(x,y)$ that have different values.

Figure 2A:
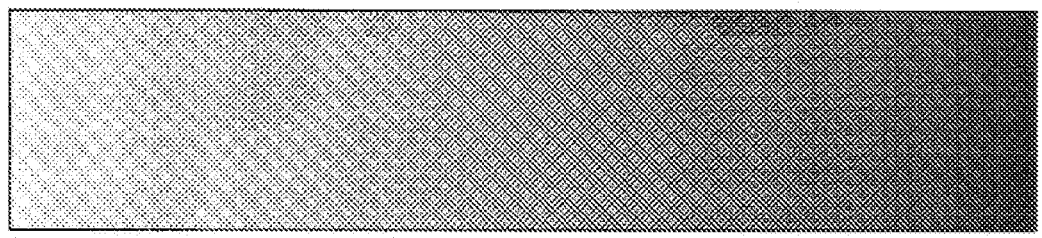
FIG. 2a is a grayscale image of a vertical black and white edge scanned while in motion.

FIG. 2a is a grayscale image of a vertical black and white edge scanned while in motion. The direction of motion is horizontal or perpendicular to the black and white edge. The motion of the edge creates a blur of diameter H in the image. The left side of the image corresponds to pixels in the white region of the image, and the right side of the image corresponds to pixels in the black region of the image. When normalized, pure white corresponds to a value of 255 and pure black corresponds to a value of 0. The black and white edge imaged in FIG. 2a has black pixels that extend from the edge for a distance greater than the blur diameter H. The black and white edge imaged in FIG. 2a has white pixels that extend from the edge for a distance greater than the blur diameter H.

Figure 2B:
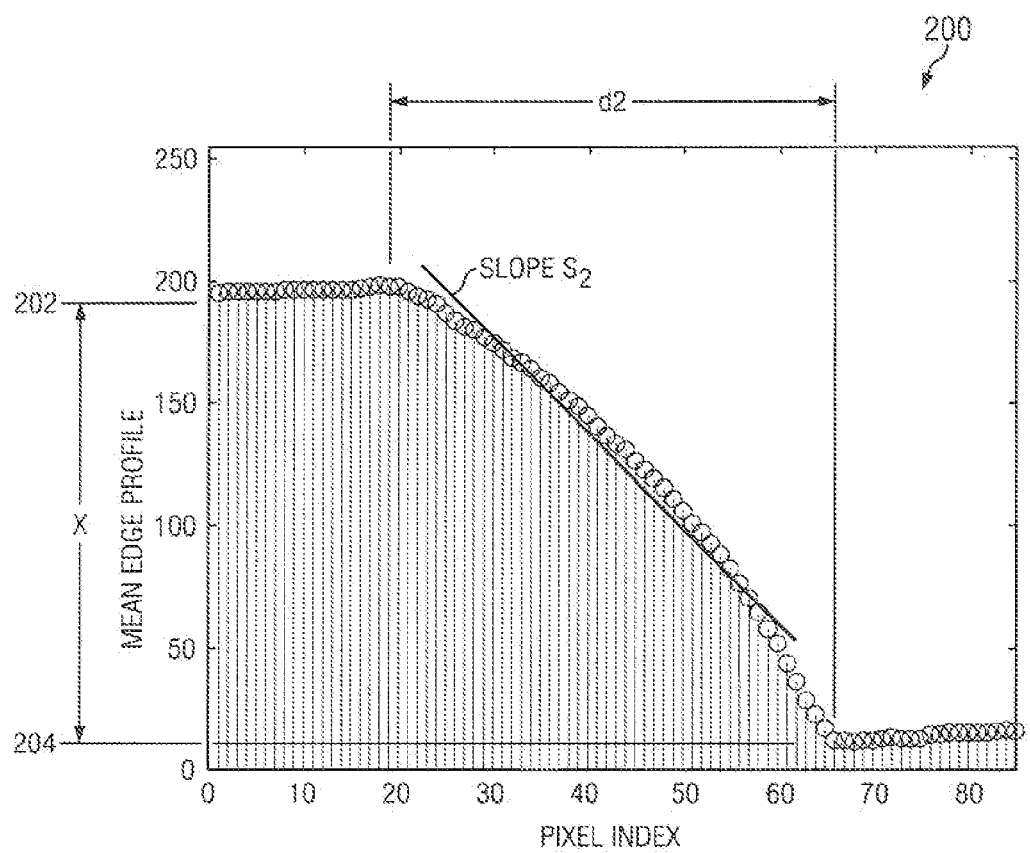
FIG. 2b is an intensity plot 200 of the image in FIG. 2a, in an example embodiment of the invention.

FIG. 2b is an intensity plot 200 of the image in FIG. 2a, in an example embodiment of the invention. Intensity plot 200 has a flat area 202 on the top left of the curve. Intensity plot 200 has a flat area 204 on the bottom right of the curve. Intensity plot 200 has a transition area d2 between the two flat areas of the curve. The flat area of the curve 202 corresponds to a white area in the image beyond the black and white edge by more than the blur diameter. The transition or sloping part of the curve of length d2 corresponds to an area of the image within the blur radius of the black and white edge. Although the sloping part of the curve is not straight, it is reasonable to approximate it with a linear slope S2. Horizontal distance d2 is a measure of the blur diameter H. The flat area of the curve 204 corresponds to a black area in the image beyond the black and white edge by more than the blur diameter.

Flat area 202 corresponds to the mean white pixel value in the image. Flat area 204 corresponds to the mean black pixel value in the image. The value X corresponds to the mean white pixel value–the mean black pixel value. The slope S2 is equal to X/d2 where d2 is equivalent to the blur diameter H. Therefore the slope S2 is inversely proportional to the blur diameter H.

In today's high speed document printing systems, many barcodes do not contain bars that are thicker than ½ the blur radius. Therefore a grayscale image of a barcode scanned with a blur radius greater than ½ the maximum bar thickness will not have flat areas in the response curve that corresponding to the black and white bars in the barcode. Therefore it may be difficult to determine the blur radius using horizontal measurements. In addition, noise in the image may make it difficult to determine the edge of the flat areas even when the blur radius is less than ½ the maximum bar thickness.

FIG. 3 is an intensity plot of the image in FIG. 2a scanned under noisy conditions, in an example embodiment of the invention. In FIG. 3, it is difficult to say where the edge of the two flat regions begins. Therefore, it may be difficult to determine the blur diameter using a horizontal measurement. The slope S3 in the transition area of FIG. 3 matches the slope S2 in the transition area of FIG. 2b. The slope in both FIG. 2b and FIG. 3 is equal to the mean white pixel value minus the mean black pixel value, divided by the blur diameter H or:

slope=(mean white pixel value–mean black pixel value)/H.

In other words, the average difference between pixel values in the transition areas of the curve is inversely proportional to the blur diameter H. Therefore, by determining the slope of a transition area, a determination of the blur diameter can be made even when the blur radius is greater than ½ the maximum bar thickness and/or when the signal from the imaging device is noisy.

In this application the direction of motion of the image content with respect to the scanning device will be assumed to be in the horizontal direction. Horizontally adjacent pixels in the image will thus be along the axis or direction of motion. The slope of a transition area can be determined by calculating the average difference in the magnitude of the pixel values between horizontally adjacent pixels. Taking the difference between the adjacent pixel values in FIG. 2b will generate two different values. The difference between adjacent pixel values in the two flatter areas of the curve (202 and 204) will be approximately zero. In the noisy case shown in FIG. 3, the difference in pixel values in the flat areas of the curve are due to noise. The difference between adjacent pixel values in the transition region (d2) of FIG. 2b will be predominantly due to motion blur and will equal the slope S2. The difference between adjacent pixel values in the transition region of FIG. 3, which corresponds to a case will more noise, will still be predominantly due to motion blur and noise. In each case, however, the differences in pixel values will fall into a bi-modal distribution with one group representing pixel differences due to noise and the second group representing pixel differences due to noise and blur. Using a threshold value, the difference in pixel values due to noise can be separated from the difference in pixel values due to motion blur. The differences in pixel values from the transition area of the image can then be analyzed to determine the value of the blur diameter H.

In one example embodiment of the invention, the following procedure is used to estimate the blur of diameter H. First the captured image will be corrected for the lighting distortion such that in an un-blurred image white is 255 and black is 0. The captured image may be an image of a barcode or may be an image of other objects that have black and white edges, for example text. The absolute value of the difference in pixel values for horizontally adjacent pixels in the captured image will then be calculated. For example:

$$d(x,y) = |b_{print+capture}(x,y) - b_{print+capture}(x,y)|,$$

where d(x,y) is the absolute value of the difference in pixel values for horizontally adjacent pixel. The image of a barcode or other black and white edges will typically have both positive and negative slopes in the image. Therefore the absolute value of the difference between adjacent horizontal pixel values is used.

Next a threshold value $T_d$ is set such that the transition areas in the image can be separated from the non-transition areas of the image. In one example embodiment of the invention $T_d$ can be set as (min(d(x,y)) max(d(x,y)))/2 where min(d(x,y))

is the minimum difference between two pixel values and max(d(x,y)) is the maximum difference between two pixel values. In another example embodiment of the invention, $T_d$ can be set as a constant value, for example 10. In yet another example embodiment of the invention, $I_d$ can be set equal to mean(d(x,y)), the average magnitude difference between pixel values. Next, the estimate of H is calculated as 255 divided by the average value of all the pixels differences that were above the threshold value, for example:

$$H' = 255 \Big/ \underset{d(x,y)>T_d}{\text{mean}} \{d(x, y)\}.$$

In some example embodiments of the invention, the median value of all the d(x,y) values above the threshold $T_d$ will be used instead of the average value. This method can be used even when the blur radius is greater that ½ the maximum bar width in a barcode that is being scanned. In addition, the actual value encoded in the barcode does not need to be known. Once an estimate of the blur radius has been determined, it can be used in a number of different ways. One way to use the blur radius is in an image pipeline to remove the blur from the image, for example with a de-convolution operation using a Wiener Filter. Another way to use the estimate of the blur radius is as the initial step in an optimization procedure that computes a more accurate determination of the blur radius.

In one example embodiment of the invention, the estimate of the blur radius will be used to construct an initial filter in an optimization procedure that computes a more accurate determination of the blurring operator. In the distortion model discussed above, motion blur was modeled as a moving average filter. Choosing a more sophisticated filter to represent the motion blur may lead to increased barcode readability. This method will optimize the blur operator such that the blur operator will produce a more accurate barcode reading process.

In one example embodiment of the invention, the optimization procedure is as follows. First one or more test barcodes are printed and then the printed barcodes are scanned while in motion. An estimate of the blur diameter H' and/or the blur operator h'(x,y) is determined using the scanned image of the barcode. Using the estimate of H', the predicted or estimated signal b'(x,y) modified by the distortion model is compared against the scanned results. Next, a number of different blur are tested to determine the candidate operator h'(x,y) that produces the minimum mismatch between the scanned results and the predicted results. In this example embodiment, the value of the barcode may be known and the distortion parameters have been estimated as M', B' and H' respectively, where M' and B' are the estimated linear lighting distortion parameters, and H' is the estimated blur diameter. When b(x, y) denotes a barcode, then the estimate or predicted barcode b'(x,y), is given by the following:

$$b'(x, y) = \underset{c(x,y)}{\text{argmax}} \rho(f(x, y), c(x, y), b_{print+capture}(x, y)),$$

where $\rho(\bullet,\bullet,\bullet)$ represents an image-based measurement of the similarity between the observed barcode $b_{print+capture}(x,y)$ and a candidate original barcode c(x,y) modified by a candidate blur operator f(x,y). One example is given by $$\rho(f(x, y), c(x, y), b_{print+capture}(x, y)) = \qquad (1)$$
$$\underset{x,y}{\text{corr}}(M' \cdot (f * c)(x, y) + B', b_{print,capture}(x, y)).$$

By performing this type of decoding over an entire data set, iterating over different choices of candidate filter choices f(x,y), a filter h'(x,y) that results in the overall best decoding performance can be determined. The estimate H' helps limit the search space for this quantity. There are a number of methods that can be used to direct this search. If the barcode is known, a least squares estimation procedure can be used to generate an initial guess, which can be iteratively refined via a simple exhaustive search, or a gradient-descent-style algorithm.

In another example embodiment of the invention, the method used to determine the filter h'(x,y) is as follows:

$$h'(x, y) = \underset{f(x,y)}{\text{argmax}} \Big( \underset{c(x,y)}{\text{max}} \rho(f(x, y), c(x, y), b_{print+capture}(x, y)) \Big), \qquad (2)$$

where $\rho(\bullet,\bullet,\bullet)$ is given by equation (1).

It is used to compute the correlation between the detected barcode signal and the estimate signal b'(x,y) modified by the degradation model. One simplification to the model that can improve the search for the optimal blur operator is to approximate h(x,y) as a one-dimensional operator h(x). This can be done by replacing equation (2) with the following:

$$h'(x) = \underset{f(x,y)}{\text{argmax}} \Big( \underset{c(x,y)}{\text{max}} \rho_x(f(x, y), c(x, y), b_{print+capture}(x, y)) \Big), \qquad (3)$$

where $\rho_x(\ldots, \ldots, \ldots)$ is given by $$\rho_x(f(x, y), c(x, y), b_{print+capture}(x, y)) =$$
$$\underset{x}{\text{corr}}\Big(M' \cdot \big(f(x) * \underset{y}{\text{mean}}\{c(x, y)\}\big) + B, \text{mean}\{b_{print+capture}(x, y)\}\Big),$$

and f(x) is a one-dimensional candidate blur operator.

Using the one-dimensional approximation reduces the calculations by an order of magnitude. Additional reductions in the amount of calculations can be achieved by reducing the search space from all possible barcodes to a subset of the total possible barcodes. The search space of all possible barcodes can be pruned using a greedy method which constructs an estimate of the barcode b'(x,y) in increments. The set of all candidate incremental signals is given by $\{\epsilon_k(x)\}$. The initial estimate for b'(x,y) is augmented by the candidate increment that increases the correlation with detected signal the most until no improvement can be made:

1. Set n=0, $b'_n(x,y)$=M'/2 B' for all x,y.
2. Estimate h'(x,y) as the operator which optimizes the least-squares difference between the distorted version of b(x,y) and the observed barcode $b_{print+capture}(x,y)$.
3. Compute k via (6):

$$k = \underset{j}{\text{argmax}} \rho_x(h'(x, y), b'_n(x, y) + \varepsilon_j(x), b_{print+capture}(x, y)).$$

4. Set $b'_{n+1}(x,y)=b'_{n+1}(x,y)+\epsilon_k(x)$.
5. If $\rho_x(h'(x,y),b'_{n+1}(x,y),b_{print+capture}(x,y)) > \rho_x(h'(x,y),b'_n(x,y),b_{print+capture}(x,y))$ go to 3.

If $\{\epsilon_k(x)\}$ is chosen such that its component signals represent a fraction of each barcode symbol at each symbol location appropriately, the probability that each symbol is in the original barcode can be computed from the set of indices $\{k\}$. By limiting the search space to the N most probable symbols per symbol location, a dramatic improvement in computational performance can be achieved (assuming that the globally optimal choice for b'(x,y) can still be found). This improvement may be limited asymptotically, but barcodes are composed of a fairly small number of symbols. In a UPC-A symbology, for example, each barcode symbol is composed of seven bars, black or white, but the symbols can only represent decimal digits 0-9. Since each half of a UPC-A barcode only contains 6 symbols, there are $10^6$ possible symbols to evaluate per half. Though this number is large, it is certainly not beyond the capabilities of most modern computers. If the greedy algorithm described above is applied using N=3 symbols per location, the search space decreases from one million possibilities to 729, which is $3^6$.

The methods described above can be performed using a processor, computer, application specific circuit (ASIC) or the like. In one example embodiment of the invention, the processor and other supporting devices, for example memory, may be embedded into a barcode reader. In other example embodiments of the invention, a computer, for example a PC or a server, may be used to perform the methods described above.

What is claimed is:

1. A method for removing blur in an image, comprising:
    calculating a set of differences in pixel values between pixels in a single image of an object, captured by an imaging device, while the object was moving with respect to the imaging device along an axis of motion, wherein the pixels are along the axis of motion and where the object has at least one black and white edge perpendicular to the axis of motion;
    separating the set of differences in pixel values into a first group and a second group, wherein the first group of differences in pixel values corresponds to differences in pixel values due to noise, and the second group of differences in pixel values corresponds to differences in pixel values due to noise and motion along the axis of motion;
    determining an estimate of the blur using the second group;
    removing blur from an image using the estimate of the blur;
    wherein separating the set of differences in pixel values into a first group and a second group is done using a single threshold value and wherein the threshold value is set equal to $(\min(d(x,y))+\max(d(x,y)))/2$ where $\min(d(x,y))$ is the minimum magnitude difference between two pixel values and $\max(d(x,y))$ is the maximum magnitude difference between two pixel values.

2. The method for removing blur in an image of claim 1, wherein the object is selected from the group comprising: a barcode, text, or a document.

3. The method for removing blur in an image of claim 1, wherein the image of the object is corrected for light distortion before the differences in pixel values are calculated.

4. The method for removing blur in an image of claim 1, wherein the estimate of blur is determined using the mean value of the set of differences in pixel value from the second group.

5. The method for removing blur in an image of claim 1, wherein the object is a barcode and a blur radius due to the motion between the barcode and the imaging device is greater than a maximum bar thickness in the barcode.

6. The method for removing blur in an image of claim 1, wherein the object scanned is a barcode, further comprising:
    selecting a distortion model that contains a filter for modeling the blur in the image;
    setting the blur in the distortion model equal to the estimate of the blur;
    producing a modified image by removing distortions in the image of the barcode using the distortion model;
    decoding the barcode from the modified image.

7. The method of claim 6, where further optimization is performed over a set of multiple instances of barcodes.

8. A method for removing blur in an image, wherein the object scanned is a barcode, comprising:
    calculating a set of differences in pixel values between pixels in an image of an object, captured by an imaging device, while the object was moving with respect to the imaging device;
    separating the set of differences in pixel values into a first group and a second group, wherein, the first group of differences in pixel values corresponds to differences in pixel values due to noise, and the second group of differences in pixel values corresponds to differences in pixel values due to noise and motion;
    determining an estimate of the blur using the second group;
    removing blur from an image using the estimate of the blur;
    selecting a distortion model that contains a filter for modeling the blur in the image;
    setting the blur in the distortion model equal to the estimate of the blur;
    calculating a predicted image using the distortion model;
    optimizing the estimate of the blur by measuring the correlation between the scanned image of the barcode and the predicted image of the barcode for different filters.

9. The method for removing blur in an image of claim 8, wherein a search space of all possible barcodes is pruned using a greedy method.

10. The method for removing blur in an image of claim 8, wherein the filter is limited to a one-dimensional filter.

11. A device for removing blur in an image, comprising:
    memory for storing a single image of an object, the single image captured by an imaging device while the object was moving with respect to the imaging device along an axis of motion;
    a processor to analyze pixels in the stored image and calculate a set of differences in pixel values between the pixels in the single image wherein the pixels are along the axis of motion and where the object has at least one black and white edge perpendicular to the axis of motion;
    the processor separating the set of differences in pixel values into a first group and a second group, wherein the first group of differences in pixel values corresponds to differences in pixel values due to noise, and the second group of differences in pixel values corresponds to differences in pixel values due to noise and motion along the axis of motion;
    the processor determining an estimate of a blur radius using the second group
    the processor removing blur from an image using the estimate of the blur radius
    wherein the processor separates the set of differences in pixel values into a first group and a second group using a threshold value wherein the threshold is set equal to $(\min(d(x,y))+\max(d(x,y)))/2$ where $\min(d(x,y))$ is the minimum magnitude difference between two pixel values and $\max(d(x,y))$ is the maximum magnitude difference between two pixel values.

12. The device for removing blur in an image of claim 11, wherein the processor separates the set of differences in pixel values into a first group and a second group using a threshold value wherein the threshold is set equal to mean(abs(d(x,y))), the mean magnitude difference between two pixel values.

13. A device for removing blur in an image comprising:
- memory for storing a image of an object, the image captured by an imaging device while the object was moving with respect to the imaging device;
- a processor to analyze pixels in the stored image and calculate a set of differences in pixel values between the pixels in the image;
- the processor separating the set of differences in pixel values into a first group and a second group, wherein the first group of differences in pixel values corresponds to differences in pixel values due to noise, and the second group of differences in pixel values corresponds to differences in pixel values due to noise and motion;
- the processor determining an estimate of a blur radius using the second group;
- the processor removing blur from an image using the estimate of the blur radius;
- wherein the object scanned is a known barcode;
- wherein the processor selects a distortion model that contains a filter for modeling the blur in the image;
- where the processor sets the blur in the distortion model equal to the estimate of the blur;
- where the processor calculates a predicted image of the known barcode using the distortion model;
- where the processor iterates with different filters in the distortion model until the correlation between the scanned image of the barcode and the predicted image of the barcode is a minimum.

14. The device for removing blur in an image of claim 13, wherein the filter is limited to a one-dimensional filter.

15. A method for removing blur in an image, comprising:
- calculating a set of differences in pixel values between pixels in an image of an object, captured by an imaging device, while the object was moving with respect to the imaging device;
- separating the set of differences in pixel values into a first group and a second group, wherein the first group of differences in pixel values corresponds to differences in pixel values due to noise, and the second group of differences in pixel values corresponds to differences in pixel values due to noise and motion;
- determining an estimate of the blur using the second group;
- selecting a distortion model that contains a filter for modeling the blur in the image;
- setting the blur in the distortion model equal to the estimate of the blur;
- calculating a predicted image using the distortion model;
- optimizing the estimate of the blur by measuring the correlation between the scanned image of the barcode and the predicted image of the barcode for different filters
- removing blur from an image using the optimized estimate of the blur.

* * * * *

UNITED STATES PATENT AND TRADEMARK OFFICE
CERTIFICATE OF CORRECTION

PATENT NO. : 8,494,282 B2  
APPLICATION NO. : 12/838857  
DATED : July 23, 2013  
INVENTOR(S) : Matthew D. Gaubatz et al.

Page 1 of 1

It is certified that error appears in the above-identified patent and that said Letters Patent is hereby corrected as shown below:

In the Claims:

In column 7, line 67, in Claim 5, delete "than" and insert -- than 1/2 --, therefor.

In column 8, line 19, in Claim 8, delete "wherein," and insert -- wherein --, therefor.

In column 8, line 58, in Claim 11, delete "group" and insert -- group; --, therefor.

In column 8, line 60, in Claim 11, delete "radius" and insert -- radius; --, therefor.

Signed and Sealed this  
Twenty-sixth Day of November, 2013

Margaret A. Focarino  
*Commissioner for Patents of the United States Patent and Trademark Office*